(12) United States Patent
Xu et al.

(10) Patent No.: US 11,992,010 B2
(45) Date of Patent: May 28, 2024

(54) USE OF 4-(PHENYLETHYNYL) BENZOIC ACID

(71) Applicant: China Jiliang University, Hangzhou (CN)

(72) Inventors: Pei Xu, Hangzhou (CN); Pingping Fang, Hangzhou (CN); Xiaofang Li, Hangzhou (CN); Zhuoyi Wang, Hangzhou (CN); Ting Sun, Hangzhou (CN); Xinyang Wu, Hangzhou (CN); Peipei Zhang, Hangzhou (CN)

(73) Assignee: China Jiliang University, Hangzhou (CN)

( * ) Notice: Subject to any disclaimer, the term of this patent is extended or adjusted under 35 U.S.C. 154(b) by 13 days.

(21) Appl. No.: 17/951,986

(22) Filed: Sep. 23, 2022

(65) Prior Publication Data

US 2023/0232826 A1    Jul. 27, 2023

(30) Foreign Application Priority Data

Jan. 24, 2022   (CN) .......................... 202210081046.5

(51) Int. Cl.
*A01N 37/10*   (2006.01)
*A01N 25/02*   (2006.01)
*A01P 13/00*   (2006.01)

(52) U.S. Cl.
CPC ............. *A01N 37/10* (2013.01); *A01N 25/02* (2013.01); *A01P 13/00* (2021.08)

(58) Field of Classification Search
CPC ......... A01N 37/10; A01N 25/02; A01P 13/00; A01P 21/00; Y02A 40/10
See application file for complete search history.

(56) References Cited

U.S. PATENT DOCUMENTS

| 4,048,217 A | 9/1977 | Rohr |
| 4,084,062 A | 4/1978 | Mihailovski |
| 2014/0088247 A1* | 3/2014 | Nair ....................... C08G 63/47 524/602 |

FOREIGN PATENT DOCUMENTS

| CN | 104823975 A | 8/2015 |
| GB | 1515394 A | 6/1978 |
| JP | S56123903 A | 9/1981 |

OTHER PUBLICATIONS

Extension (lawn & Garden), 2020.*
National Library of Medicine, National center for Biotechnology Information, (4-phenylethynyl)benzoic acid), Sep. 14, 2005.*
C. E. Minarik et al., New Growth-Regulating Compounds II. Substituted Benzoic Acids, Botanical Gazette; vol. 113, No. 2; 1951; pp. 135-147.
Li Ming-Jian et al., QSAR study on the regulator activity of substituted benzoic acids to plant growth using topological methods, Journal of Harbin Institute of Technology, vol. 41, No. 5, 2009; pp. 195-197.
Office Action cited in corresponding patent application No. 202210081046.5; Apr. 12, 2023; 14 pp.
Robert M. Muir et al., The relationship of structure and plant growth activity of substituted benzoic and phenoxyacetic acids, Plant Physiology; vol. 26(2); 1951; pp. 369-374.

* cited by examiner

*Primary Examiner* — Zohreh A Fay
(74) *Attorney, Agent, or Firm* — Lempia Summerfield Katz LLC

(57) ABSTRACT

The present disclosure provides the use of 4-(Phenylethynyl) benzoic acid in preparing a plant growth regulator. 4-(Phenylethynyl) benzoic acid has a formula as $C_{15}H_{10}O_2$, a molecular weight of 222.2390. The optimum concentration of 4-(Phenylethynyl) benzoic acid in the plant growth regulator is in a range of 10 µM to 200 µM. The plant growth regulator further contains a pesticidally acceptable carrier. The present disclosure further provides the use of 4-(Phenylethynyl) benzoic acid in regulating plant growth. In the use of 4-(Phenylethynyl) benzoic acid in preparing a plant growth regulator of the present disclosure, 4-(Phenylethynyl) benzoic acid has the ABA-like effects, and is more stable, easily available, cheaper, and environmentally friendly. Therefore, the present disclosure is suitable for large-scale popularization.

12 Claims, 4 Drawing Sheets

USE OF 4-(PHENYLETHYNYL) BENZOIC ACID

CROSS-REFERENCE TO RELATED APPLICATION

This application claims the benefit of priority to Chinese Patent Application No. 202210081046.5 filed in the Chinese Intellectual Property Office on Jan. 24, 2022, which is hereby incorporated by reference in its entirety.

FIELD

The present disclosure relates to the technical field of biotechnology and agronomy, especially to the technical field of plant growth regulation. In particular, the present disclosure relates to methods of using 4-(Phenylethynyl) benzoic acid.

BACKGROUND

Abscisic Acid (ABA), commonly known as the "stress hormone", not only participates in plant growth processes, but also plays a protective role in a variety of environmental stresses. ABA signaling starts from the perception of ABA by PYRABACTIN RESISTANCE/PYR1 LIKE/REGULATORY COMPONENT OF ABA RECEPTOR (PYR/PYL/RCAR) receptor complex. ABA-bound receptors inactivate the negative regulatory factor of the PROTEIN PHOSPHATASE 2C (PP2Cs) and subsequently activate SnRK2 protein kinases that suppressed by PP2Cs in absence of ABA, and then ABA-bound receptors facilitate downstream ABA signaling to regulate physiological responses in plants. Endogenous level of ABA is known to increase during seed dormancy, stomatal closure, and early response processes to various stresses such as drought.

By application of exogenous ABA, rice ear germination can be efficiently inhibited, flowering period and the coloring of grapefruit can be regulated, and the lifespan of cut flowers can be prolonged. In addition, exogenous ABA is identified to prevent the seedlings wilting after repotting and is confirmed to improve the tolerance of crops in response to various abiotic and biotic stresses.

However, naturally active ABA has not been widely used in agriculture because of its high cost and instability.

Therefore, there is an urgent need in this field to develop a compound, which has ABA-like effects and is more stable, easily available, and cheaper.

SUMMARY

In order to overcome the above-mentioned shortcomings of the prior art, one object of the present disclosure is to provide the use of 4-(Phenylethynyl) benzoic acid in preparing a plant growth regulator, wherein 4-(Phenylethynyl) benzoic acid has the Abscisic Acid (ABA)-like effects, and is more stable, easily available, cheaper, and environmentally friendly. Therefore, the present disclosure is suitable for large-scale popularization.

Another object of the present disclosure is to provide the use of 4-(Phenylethynyl) benzoic acid in inhibiting seed germination, blocking radicle elongation, and promoting stomata closure. Therefore, the present disclosure is suitable for large-scale popularization.

In order to realize the above objects, in a first aspect of the present disclosure, the use of 4-(Phenylethynyl) benzoic acid in preparing a plant growth regulator is provided, wherein 4-(Phenylethynyl) benzoic acid has a formula as $C_{15}H_{10}O_2$ and a structure as follows:

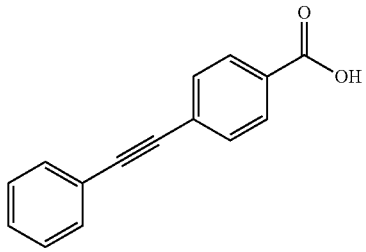 [SMILES: O=C(O)c1ccc(C#Cc2ccccc2)cc1]

4-(Phenylethynyl) benzoic acid has a molecular weight of 222.2390.

In an embodiment, the concentration of 4-(Phenylethynyl) benzoic acid in the plant growth regulator ranges from 10 micromolar (μM) to 200 μM.

In an embodiment, the plant growth regulator further contains a pesticidally acceptable carrier.

In a second aspect of the present disclosure, the use of 4-(Phenylethynyl) benzoic acid in inhibiting seed germination is provided.

In a third aspect of the present disclosure, the use of 4-(Phenylethynyl) benzoic acid in blocking radicle elongation is provided.

In a fourth aspect of the present disclosure, the use of 4-(Phenylethynyl) benzoic acid in promoting stomata closure is provided.

The beneficial effects of the present disclosure are as follows:

The use of 4-(Phenylethynyl) benzoic acid in preparing a plant growth regulator is disclosed. 4-(Phenylethynyl) benzoic acid has a formula as $C_{15}H_{10}O_2$, a molecular weight of 222.2390, and a structure as follows:

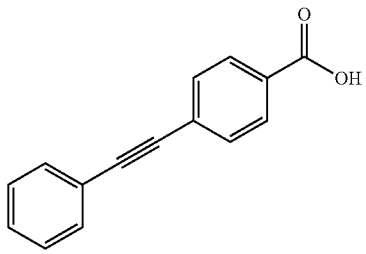 [SMILES: O=C(O)c1ccc(C#Cc2ccccc2)cc1]

4-(Phenylethynyl) benzoic acid has the ABA-like effects and is more stable, easily available, cheaper, and environmentally friendly. Therefore the present disclosure is suitable for large-scale popularization.

The use of 4-(Phenylethynyl) benzoic acid in inhibiting seed germination, blocking radicle elongation, and promoting stomata closure is disclosed. 4-(Phenylethynyl) benzoic acid can inhibit seed germination, block radicle elongation, and promote stomata closure. Therefore, the present disclosure is suitable for large-scale popularization.

These and other objects, characteristics, and advantages of the present disclosure are elaborated sufficiently through the following detailed description and the drawings and can be achieved with the methods, the means, and their combinations particularly pointed out in the description.

DETAILED DESCRIPTION

Figure 1:
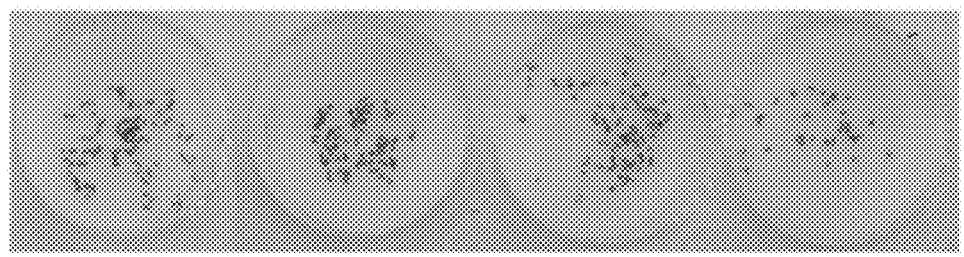
FIG. 1 shows the inhibition effects of 4-(Phenylethynyl) benzoic acid on seeds germination in *Arabidopsis*, wherein A shows phynotypes of *Arabidopsis* seeds treated with 4-(Phenylethynyl) benzoic acid at different concentrations for 66 h; and B shows germination rates of *Arabidopsis* seeds treated with 4-(Phenylethynyl) benzoic acid at different concentrations for 30 h, 42 h, 48 h, 54 h, and 66 h.
Figure 1:
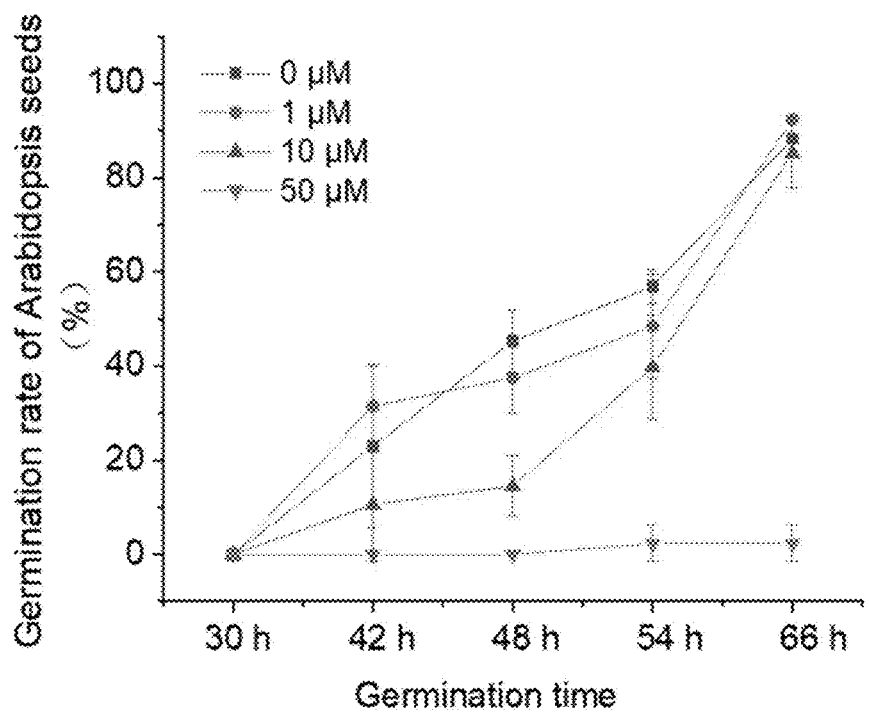

In order to find an Abscisic Acid (ABA) substitute, which is more stable, easily available, cheaper, and environmentally friendly, the present disclosure provides the use of 4-(Phenylethynyl) benzoic acid in preparing a plant growth regulator, wherein 4-(Phenylethynyl) benzoic acid has a formula as $C_{15}H_{10}O_2$ and a structure as follows:

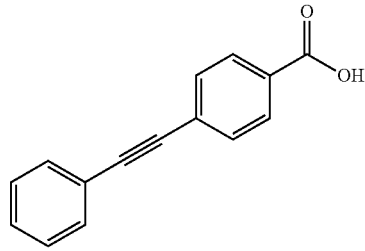 [SMILES: O=C(O)c1ccc(C#Cc2ccccc2)cc1]

4-(Phenylethynyl) benzoic acid has a molecular weight of 222.2390.

The concentration of 4-(Phenylethynyl) benzoic acid in the plant growth regulator can be determined as needed. In an embodiment, the concentration of 4-(Phenylethynyl) benzoic acid in the plant growth regulator ranges from 10 μM to 200 μM.

The plant growth regulator can further contain any other suitable composition. In an embodiment, the plant growth regulator further contains a pesticidally acceptable carrier.

The "pesticidally acceptable carrier" described above refers to a solvent, a suspension agent, or an excipient acceptable in pesticide for delivering 4-(phenylacetylene) benzoic acid into plants. The pesticidally acceptable carrier suitable for the present disclosure may be selected from water, dimethyl sulphoxide (DMSO), buffers, Hoagland nutrient solution, surfactants such as Tween-80, silicone, or combinations thereof.

The present disclosure further provides the use of 4-(Phenylethynyl) benzoic acid in inhibiting seed germination.

The present disclosure further provides the use of 4-(Phenylethynyl) benzoic acid in blocking radicle elongation.

The present disclosure further provides the use of 4-(Phenylethynyl) benzoic acid in promoting stomata closure.

In order to understand the technical content of the present disclosure clearly, the present disclosure is further exemplified by reference to the following examples. The examples of the present disclosure are described but are not limited to the present disclosure.

Example 1: Effects of 4-(Phenylethynyl) Benzoic Acid on Seed Germination

1. Plant Materials

The seeds of *Arabidopsis* wild type (*Arabidopsis thaliana* L. Columbia, Col-0 ecotype) were provided by the lab of plant quality & safety biology in China Jiliang university. The commercial tomato seeds (*Solanum lycopersicum* CV. Zhefen 202) were provided by Zhejiang Academy of Agricultural Sciences.

2. Preparation of Treatment Solutions 4-(Phenylethynyl) benzoic acid solutions: 4-(Phenylethynyl) benzoic acid (Shanghai Yuanye Biotechnology Co., Ltd), dimethyl sulfoxide (DMSO) and water.

DMSO, as an organic solvent, here was used to dissolve 4-(Phenylethynyl) benzoic acid to make 4-(Phenylethynyl) benzoic acid more easily to be mixed with other compositions.

The 4-(Phenylethynyl) benzoic acid solutions were prepared as follows: 22.9 mg 4-(Phenylethynyl) benzoic acid was weighted and dissolved in 1 mL DMSO to make the 100 mM 4-(Phenylethynyl) benzoic acid mother solution. The working solutions applied were prepared by diluting the 4-(phenylethynyl) benzoic acid mother solution with water. For example, the 4-(Phenylethynyl) benzoic acid treatment solutions at the concentrations of 1 μM, 10 μM, and 50 μM were prepared by diluting 1 μL of the 100 mM 4-(phenylethynyl) benzoic acid mother solution to 100 mL, 10 mL, or 2 mL with water. DMSO was supplemented to a final concentration of 0.05% (V:V).

0.05% DMSO water solution then used as a control solution.

3. Germination Experiment

*Arabidopsis* seeds were soaked in 4-(Phenylethynyl) benzoic acid treatment solutions at the concentrations of 1 μM, 10 μM, and 50 μM for 3 days under dark at 4° C., respectively. Seeds soaked in the 0.05% DMSO water solution were used as control. On the fourth day, Seeds were transformed to light at 25° C. in 2-cm-diameter Petri dishes with two layers of filter papers. Different concentrations of 4-(Phenylethynyl) benzoic acid treatment solutions were added as germination liquids. 0.05% DMSO water solution was used as control. 30-50 seeds were placed on the moist filter paper in a Petri dish. There were three replicates for each treatment. After germination for 30 h, 42 h, 48 h, and 66 h in a growth chamber (25° C.), the germination rate (the proportion of the total number of the seeds germinated corresponding to each time point after the start of the germination experiment to the total number of seeds to be tested) was calculated, respectively. The germination rate at 48 h was adopted as the germination potential (the proportion of the total number of the seeds germinated corresponding to 48 h after the start of the germination experiment to the total number of seeds to be tested).

For tomato, 80 seeds were sowed on two layers of filter papers in a 6-cm-diameter Petri dish with germination liquids. 4-(Phenylethynyl) benzoic acid treatment solution at the concentration of 50 μM and 0.05% DMSO water solution (Control) were used as the germination liquids. There were three replicates for each treatment. After germination for 24 h, 36 h, 48 h, 60 h, 72 h, 84 h in a growth chamber (25° C.), the germination rate (the proportion of the total number of the seeds germinated corresponding to each time point after the start of the germination experiment to the total number of seeds to be tested) was calculated, respectively. The germination rate at 48 h was adopted as the germination potential (the proportion of the total number of the seeds germinated corresponding to 48 h after the start of the germination experiment to the total number of seeds to be tested).

4. Results

Figure 2:
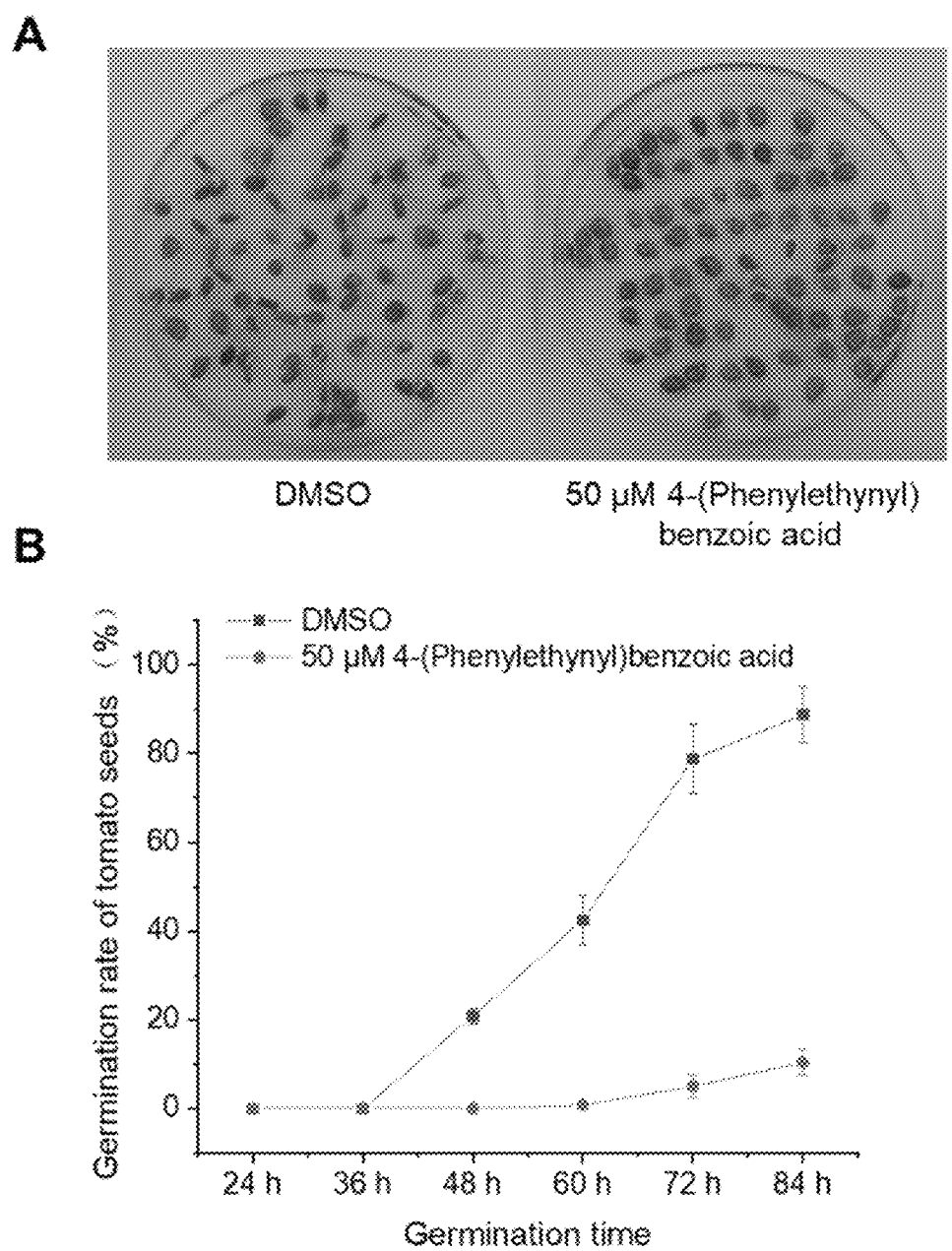
FIG. 2 shows the inhibition effects of 4-(Phenylethynyl) benzoic acid on seeds germination in tomato, wherein A shows phynotypes of tomato seeds treated with 50 μM 4-(Phenylethynyl) benzoic acid for 84 h; and B shows germination rates of tomato seeds treated with 50 μM 4-(Phenylethynyl) benzoic acid for 24 h, 36 h, 48 h, 60 h, 72 h, and 84 h.

Results of seeds germination on *Arabidopsis* and tomato were shown in FIG. 1, FIG. 2, and TABLE 1.

acid treatment solution and 0.2% DMSO water solution was used as the control solution for 200 μM 4-(Phenylethynyl) benzoic acid treatment solution respectively.

3. Treatment

A volume of 10 ml 4-(Phenylethynyl) benzoic acid treatment solutions at various concentrations were added to 9-cm-diameter Petri dishes with two layers of filter papers. 100 seeds were placed on the moist filter paper in a Petri dish. 0.05% DMSO water solution was used as control for 50 μM 4-(Phenylethynyl) benzoic acid treatment solution. 0.2% DMSO water solution was used as control for 200 μM 4-(Phenylethynyl) benzoic acid treatment solution. There were three replicates for each treatment. Seeds were germinated under light at 28° C. The seeds that germinated between the second and the third day after imbibition were chosen and their radicle length were measured on the fifth day.

4. Results 4-(Phenylethynyl) benzoic acid treatment solutions at 50 μM and 200 μM both significantly inhibited rice radicle elongation in relative to their controls. Also, the inhibitory effect of 200 μM 4-(Phenylethynyl) benzoic acid treatment

TABLE 1

Effects of 4-(Phenylethynyl) benzoic acid on seeds germination on *Arabidopsis* and tomato

| species | Treatment solution | Concentration (μM) | Germination potential/ % (48 h) | Ultimate germination rate/% |
|---|---|---|---|---|
| *Arabidopsis* | Control | 0 | 45.31 ± 6.63 a | 88.32 ± 1.15 a |
| | 4-(Phenylethynyl) benzoic acid | 1 | 37.50 ± 7.50 a | 92.33 ± 0.29 a |
| | | 10 | 14.53 ± 6.40 b | 85.24 ± 7.41 a |
| | | 50 | 0.00 ± 0.00 b | 2.30 ± 3.98 b |
| Tomato | Control | 0 | 20.83 ± 1.90 a | 88.75 ± 6.25 a |
| | 4-(Phenylethynyl) benzoic acid | 50 | 0.00 ± 0.00 b | 10.41 ± 2.88 b |

Different lowercase letters indicate significant differences among treatment groups under t-test ($P < 0.05$).

4-(Phenylethynyl) benzoic acid treatment solutions at 10 μM and 50 μM significantly slowed down the germination of *Arabidopsis* seeds (as shown in B of FIG. 1), wherein 4-(Phenylethynyl) benzoic acid treatment solution at 50 μM exhibited a stronger effect. 4-(Phenylethynyl) benzoic acid treatment solution at 10 μM resulted in a >20% decrease in germination potential. Whereas 4-(Phenylethynyl) benzoic acid treatment solution at 50 μM reduced the germination potential to zero and resulted in a >80% germination rate reduction ultimately. The inhibitory effect of 50 μM 4-(Phenylethynyl) benzoic acid treatment solution on tomato seeds germination was further tested. Compared to the control, 4-(Phenylethynyl) benzoic acid treatment solution at 50 μM significantly inhibited the germination process and reduced the germination rate in tomato (as shown in B of FIG. 2).

Example 2: Effects of 4-(Phenylethynyl) Benzoic Acid on Rice Radicle Elongation

1. Plant Material

Rice cultivar (*Oryza sativa* L. Datian Nip) was provided by Zhejiang Academy of Agricultural Sciences.

2. Preparation of Treatment Solutions

Figure 3:
FIG. 3 shows the inhibition effects of 4-(Phenylethynyl) benzoic acid on radicle elongation in rice, wherein A and B show phynotypes of rice radicles treated with 4-(Phenylethynyl) benzoic acid at concentrations of 50 μM (A) and 200 μM (B) for 4 days; and C and D show radicle lengths of rice seeds treated with 4-(Phenylethynyl) benzoic acid at concentrations of 50 μM (C) and 200 μM (D) for 4 days.
Figure 3:
Figure 3:
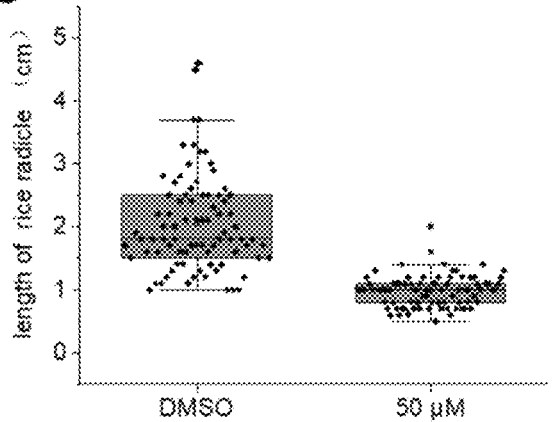
Figure 3:
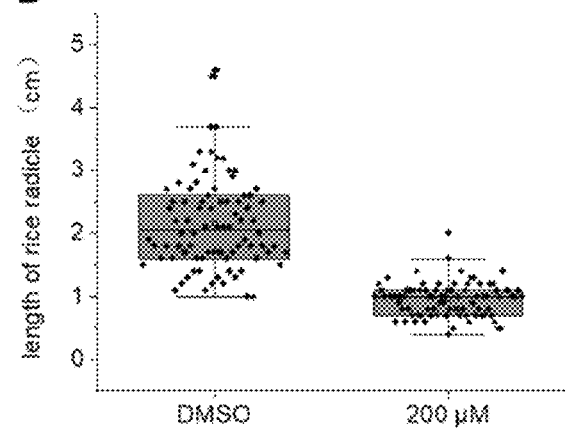

Every 1 μL 4-(Phenylethynyl) benzoic acid mother solution in Example 1 was diluted with water to 2 mL or 500 μL to prepare 50 μM or 200 μM 4-(Phenylethynyl) benzoic acid treatment solutions. 0.05% DMSO water solution was used as the control solution for 50 μM 4-(Phenylethynyl) benzoic solution was significantly better than that of 50 μM 4-(Phenylethynyl) benzoic acid treatment solution. The radicle length of rice treated with 50 μM and 200 μM 4-(phenylacetylene) benzoic acid were 48.2% and 20.3% of those in control treatments, respectively. Results were shown in FIG. 3.

Example 3: Effects of 4-(Phenylethynyl) Benzoic Acid on Stomata Closure

1. Plant Material

The commercial tomato seeds (*Solanum lycopersicum* CV. Zhefen 202) were provided by Zhejiang Academy of Agricultural Sciences.

2. Preparation of Treatment Solutions

The concentration of 4-(Phenylethynyl) benzoic acid used in this example was 50 μM. Every 1 μL of the 100 mM 4-(Phenylethynyl) benzoic acid mother solution in Example 1 was diluted to 2 mL with MES-KCl buffer (10 mM MES, 50 mM KCl, pH 6.15). 0.5% Tween-80 (V:V) was added to increase the solubility and stability of 4-(Phenylethynyl) benzoic acid. The solution was mixed evenly by stirring efficiently and it was ensured that no 4-(phenylethynyl) benzoic acid was precipitated, and finally 50 μM 4-(phenylethynyl) benzoic acid was prepared.

The control solution was the MES-KCl buffer containing 0.05% DMSO and 0.5% Tween-80.

3. Treatment

Abaxial epidermal strips of tomato were firstly peeled from washed leaves, then immersed in MES-KCl buffer (10 mM MES, 50 mM KCl, pH 6.15) under light at 28° C. to induce stomatal opening. After 2 hours, abaxial epidermal strips of tomato were treated with the control solution (MES-KCl buffer with 0.05% DMSO and 0.5% Tween-80) and 50 μM 4-(Phenylethynyl) benzoic acid treatment solution (MES-KCl buffer with 50 μM 4-(Phenylethynyl) benzoic acid, 0.05% DMSO and 0.5% Tween-80) for 3 hours, respectively. Then, the epidermal strips were observed under a 40×microscope. Widths and lengths of stomata were measured and the aperture ratios (width:length) were calculated. There were four replicates for each treatment, and each replicate contained data from 5-7 visual fields of microscope (with about 50 stomata).

4. Results

Figure 4:
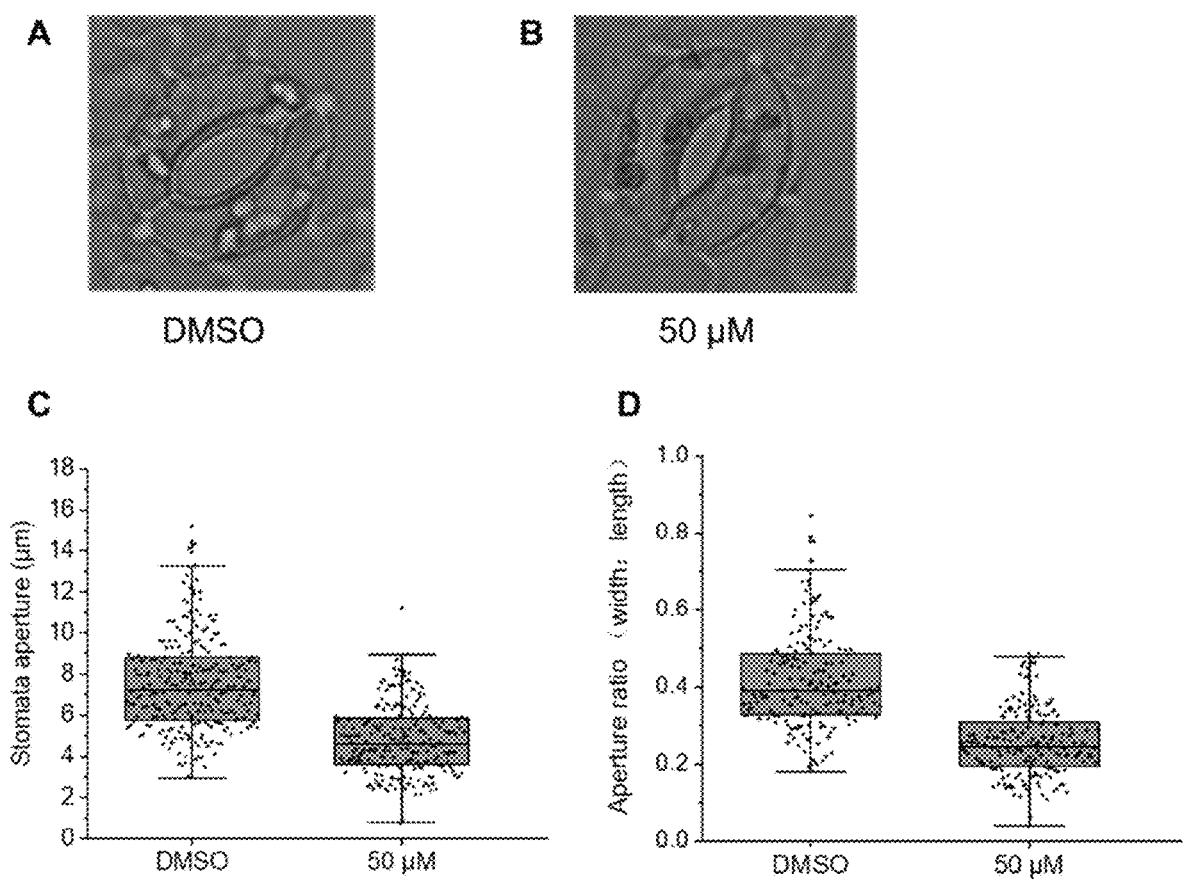
FIG. 4 shows the positive effects of 4-(Phenylethynyl) benzoic acid on promoting stomata closure in tomato, wherein A and B show images of stomata of tomato leaves treated with dimethyl sulphoxide (DMSO) (A) and 50 μM 4-(Phenylethynyl) benzoic acid (B) for 3 h in vitro; and C and D show stomatal aperture (C) and aperture ratio (D) measured in abaxial epidermal strips of tomato treated with 50 μM 4-(Phenylethynyl) benzoic acid for 3 hours.

In order to determine the effects of 4-(phenylethynyl) benzoic acid on stomata closure, abaxial epidermal strips of tomato were treated with 50 μM 4-(Phenylethynyl) benzoic acid treatment solution. Compared to the control, stomata aperture and aperture ratio under treatment of 50 μM 4-(Phenylethynyl) benzoic acid treatment solution were significantly reduced. Results are shown in FIG. 4.

In the present specification, the present disclosure has been described according to the particular embodiments. However, it should be apparent to those having ordinary skill in the art that these embodiments can be modified or changed without departure from the spirit and scope of the present disclosure. Therefore, the specification and the drawings described above are exemplary only and not intended to be limiting.

The invention claimed is:

1. A method of inhibiting seed germination, the method comprising:
    providing a solution comprising 4-(Phenylethynyl) benzoic acid; and
    inhibiting the seed germination using the solution.

2. The method of claim 1, wherein the 4-(Phenylethynyl) benzoic acid has a formula as $C_{15}H_{10}O_2$, a molecular weight of 222.2390, and a structure as follows:

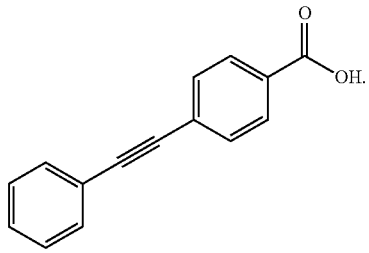 [SMILES: O=C(O)c1ccc(C#Cc2ccccc2)cc1]

3. The method of claim 2, wherein a concentration of 4-(Phenylethynyl) benzoic acid in the solution is in a range of 10 μM to 200 μM.

4. The method of claim 3, wherein the solution further comprises a pesticidally acceptable carrier comprising water, dimethyl sulphoxide (DMSO), at least one buffer, Hoagland nutrient solution, at least one surfactant, or a combination thereof.

5. A method of blocking radicle elongation, the method comprising:
    providing a solution comprising 4-(Phenylethynyl) benzoic acid; and
    blocking the radicle elongation using the solution.

6. The method of claim 5, wherein the 4-(Phenylethynyl) benzoic acid has a formula as $C_{15}H_{10}O_2$, a molecular weight of 222.2390, and a structure as follows:

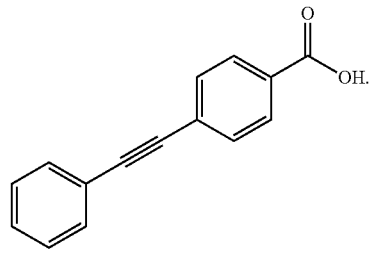 [SMILES: O=C(O)c1ccc(C#Cc2ccccc2)cc1]

7. The method of claim 6, wherein a concentration of the 4-(Phenylethynyl) benzoic acid in the solution is in a range of 10 μM to 200 μM.

8. The method of claim 7, wherein the solution further comprises a pesticidally acceptable carrier comprising water, dimethyl sulphoxide (DMSO), at least one buffer, Hoagland nutrient solution, at least one surfactant, or a combination thereof.

9. A method of promoting stomata closure, the method comprising:
    providing a solution comprising 4-(Phenylethynyl) benzoic acid; and
    promoting the stomata closure using the solution.

10. The method of claim 9, wherein the 4-(Phenylethynyl) benzoic acid has a formula as $C_{15}H_{10}O_2$, a molecular weight of 222.2390, and a structure as follows:

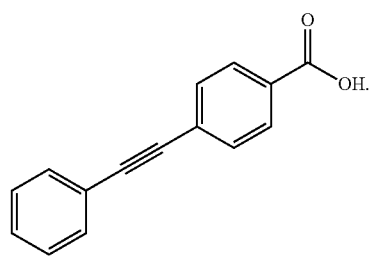 [SMILES: O=C(O)c1ccc(C#Cc2ccccc2)cc1]

11. The method of claim 10, wherein a concentration of 4-(Phenylethynyl) benzoic acid in the solution is in a range of 10 μM to 200 μM.

12. The method of claim 11, wherein the solution further comprises a pesticidally acceptable carrier comprising water, dimethyl sulphoxide (DMSO), at least one buffer, Hoagland nutrient solution, at least one surfactant, or a combination thereof.

* * * * *